(12) United States Patent
Chen et al.

(10) Patent No.: US 12,522,114 B2
(45) Date of Patent: Jan. 13, 2026

(54) SYSTEMS AND METHODS FOR FLIPPING A SEAT OF A VEHICLE

(71) Applicant: GM GLOBAL TECHNOLOGY OPERATIONS LLC, Detroit, MI (US)

(72) Inventors: Shuguang Chen, Shanghai (CN); Jean Marc Lapp, Grosse Pointe Shores, MI (US); Dichuan Pang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 18/420,975

(22) Filed: Jan. 24, 2024

(65) Prior Publication Data

US 2025/0236220 A1    Jul. 24, 2025

(30) Foreign Application Priority Data

Jan. 19, 2024   (CN) .......................... 202410081227.7

(51) Int. Cl.
*B60N 2/20* (2006.01)
*B60N 2/02* (2006.01)
*B60N 2/14* (2006.01)
*B60N 2/90* (2018.01)

(52) U.S. Cl.
CPC ......... *B60N 2/203* (2013.01); *B60N 2/02253* (2023.08); *B60N 2/0226* (2023.08); *B60N 2/929* (2018.02)

(58) Field of Classification Search
CPC ............ B60N 2/02246; B60N 2/02253; B60N 2/0233; B60N 2/143; B60N 2/203

USPC ....... 297/1, 3, 92, 94, 95, 96, 101, 103, 104
See application file for complete search history.

(56) References Cited

U.S. PATENT DOCUMENTS

| | | | | |
|---|---|---|---|---|
| 9,583 A * | 2/1853 | Briggs | .................... | B60N 2/203 |
| | | | | 297/230.13 |
| 364,011 A * | 5/1887 | Hale | ...................... | B60N 2/203 |
| | | | | 297/95 |
| 433,168 A * | 7/1890 | Hale | ........................ | B60N 2/20 |
| | | | | 70/261 |
| 491,761 A * | 2/1893 | Aze et al. | .............. | B60N 2/203 |
| | | | | 297/103 |
| 542,411 A * | 7/1895 | Johnston | ................... | A47C 7/48 |
| | | | | 297/97 |
| 566,675 A * | 8/1896 | Forney | ..................... | B60N 2/75 |
| | | | | 297/284.1 |
| 613,423 A * | 11/1898 | Pickles | ............. | B61D 33/0028 |
| | | | | 297/103 |

(Continued)

FOREIGN PATENT DOCUMENTS

| | | | | |
|---|---|---|---|---|
| DE | 4336710 A1 * | 4/1994 | ............. | B60N 2/242 |
| DE | 102018007523 A1 * | 3/2020 | ............. | B60N 2/203 |

(Continued)

*Primary Examiner* — Ryan D Kwiecinski
(74) *Attorney, Agent, or Firm* — Ingrassia Fisher & Lorenz, LLP | IF&L

(57) ABSTRACT

Methods and systems are provided for flipping a seat of a vehicle. The systems include a base member for the seat, a drive mechanism partially used for driving the base member to rotate, a first support member and a second support member of the seat, a backrest member, a lock mechanism for locking and unlocking the backrest member with the second support member, a rotation mechanism, and a control module for sending a command to flip the seat.

20 Claims, 13 Drawing Sheets

(56) References Cited

U.S. PATENT DOCUMENTS

| | | | | |
|---|---|---|---|---|
| 615,227 | A * | 11/1898 | Pickles | B60N 2/203 297/97 |
| 675,367 | A * | 5/1901 | Gilfillan | B60N 2/203 297/101 |
| 679,081 | A * | 7/1901 | Koehler | B60N 2/203 297/103 |
| 725,996 | A * | 4/1903 | Siegel | A47C 7/48 297/95 |
| 731,205 | A * | 6/1903 | McKaig | B60N 2/203 297/94 |
| 795,501 | A * | 7/1905 | Fassett | B60N 2/203 297/101 |
| 814,514 | A * | 3/1906 | Budd | B61D 33/0028 297/97 |
| 1,196,908 | A * | 9/1916 | Walker | B61D 33/0028 297/97 |
| 1,298,823 | A * | 4/1919 | Taylor | B60N 2/203 297/103 |
| 1,742,037 | A * | 12/1929 | Kleinschmidt | B60N 2/143 297/325 |
| 2,004,850 | A * | 6/1935 | Bugatti | B60N 2/203 297/100 |
| 3,877,746 | A * | 4/1975 | Christine | B60N 2/203 297/95 |
| 4,081,051 | A * | 3/1978 | Logsdon | B60N 2/203 296/65.09 |
| 4,322,052 | A * | 3/1982 | Hodge | B60N 2/203 296/65.09 |
| 4,470,629 | A * | 9/1984 | Collins, Jr. | A47C 17/34 297/67 |
| 4,655,503 | A * | 4/1987 | Kamijo | B60N 2/3084 297/238 |
| 5,882,075 | A * | 3/1999 | Partington | B60N 2/688 297/344.13 |
| 6,715,825 | B2 * | 4/2004 | Tame | B60N 2/203 297/94 |
| 6,991,285 | B1 * | 1/2006 | Hemenway | B60N 2/203 297/440.16 |
| 7,156,442 | B2 * | 1/2007 | McManus | B60N 2/933 296/65.09 |
| 7,281,761 | B2 * | 10/2007 | Brown | B60N 2/818 297/188.05 |
| 7,387,338 | B2 * | 6/2008 | Beranek | B60N 2/203 297/383 |
| 7,644,982 | B2 * | 1/2010 | Paluch | B60N 2/853 297/94 |
| 9,045,062 | B2 * | 6/2015 | Deimen | B60N 3/002 |
| 9,315,238 | B2 * | 4/2016 | Neese | B60N 2/203 |
| 11,453,315 | B2 * | 9/2022 | Ravestein | B60N 2/809 |
| 11,919,427 | B2 * | 3/2024 | Vetere | B60N 2/203 |
| 12,195,186 | B2 * | 1/2025 | Vandewall | B64D 11/0606 |
| 2004/0256894 | A1 * | 12/2004 | McManus | B60N 2/2231 297/93 |
| 2008/0290700 | A1 * | 11/2008 | Paluch | B60N 2/203 297/95 |
| 2009/0277372 | A1 * | 11/2009 | Wood | B63B 29/04 297/94 |
| 2018/0229628 | A1 * | 8/2018 | Minato | B60N 2/2227 |
| 2021/0229582 | A1 * | 7/2021 | Vetere | B60N 2/203 |
| 2022/0144146 | A1 * | 5/2022 | Kondrad | B60N 2/345 |
| 2022/0314842 | A1 * | 10/2022 | Roche | B60N 2/045 |
| 2023/0166644 | A1 * | 6/2023 | Yun | B60N 2/3065 297/311 |
| 2025/0236220 | A1 * | 7/2025 | Chen | B60N 2/929 |

FOREIGN PATENT DOCUMENTS

| | | | | |
|---|---|---|---|---|
| DE | 102018007523 B4 | | 5/2022 | |
| DE | 102022106318 A1 | * | 10/2022 | ............... B60N 2/12 |
| FR | 2671530 A1 | * | 7/1992 | ............. B61D 33/00 |
| FR | 2863558 A1 | * | 6/2005 | ........... B60N 2/0224 |
| FR | 2873067 A1 | * | 1/2006 | ........... B60N 2/1846 |
| GB | 419168 A | * | 11/1934 | ............. B60N 2/203 |
| JP | H09188172 A | * | 7/1997 | |
| WO | WO-0170537 A1 | * | 9/2001 | ............. B60N 2/203 |
| WO | WO-2007056850 A1 | * | 5/2007 | ............... B60N 2/30 |
| WO | WO-2019210302 A1 | * | 10/2019 | ............. B60N 2/986 |

\* cited by examiner

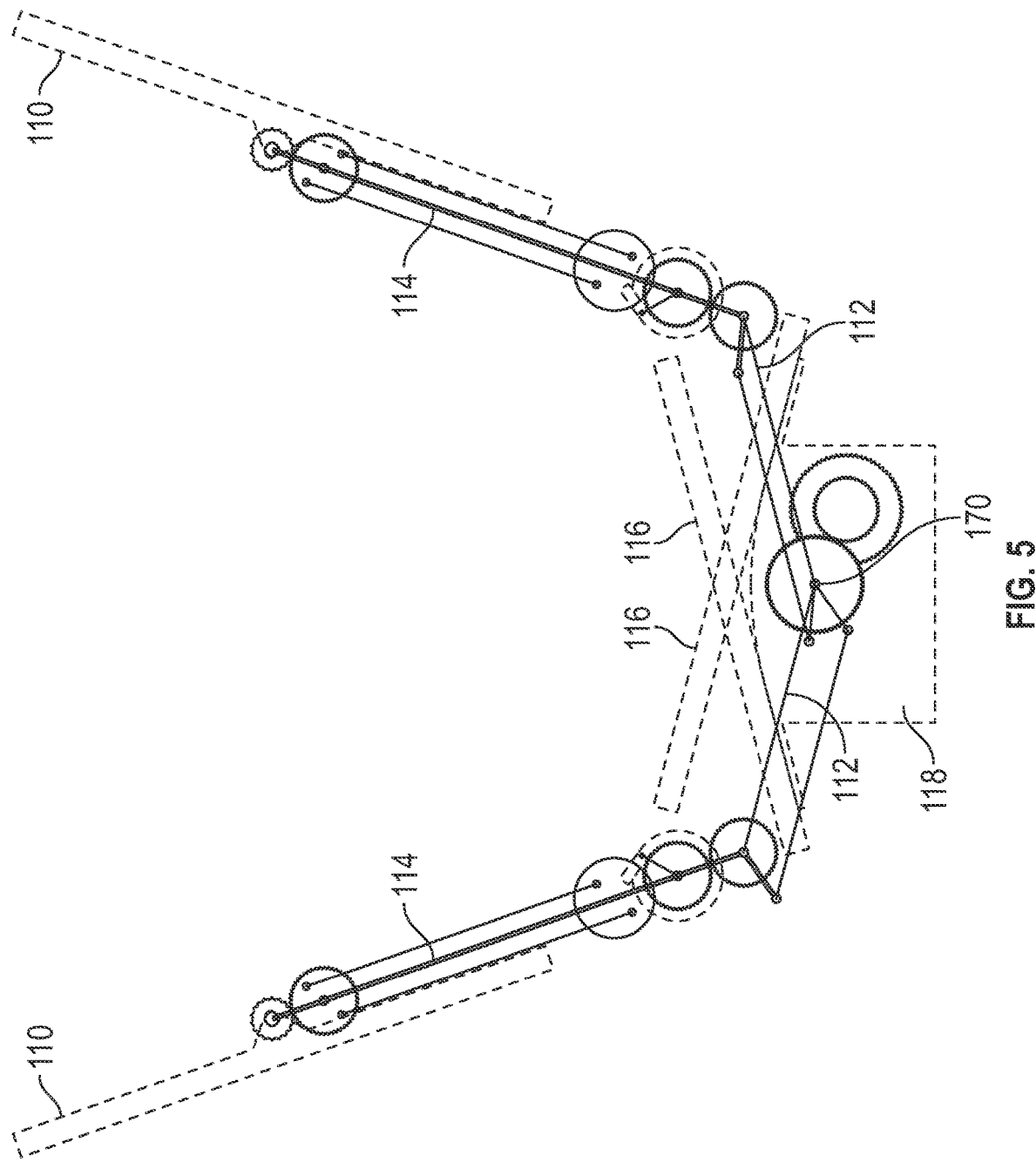

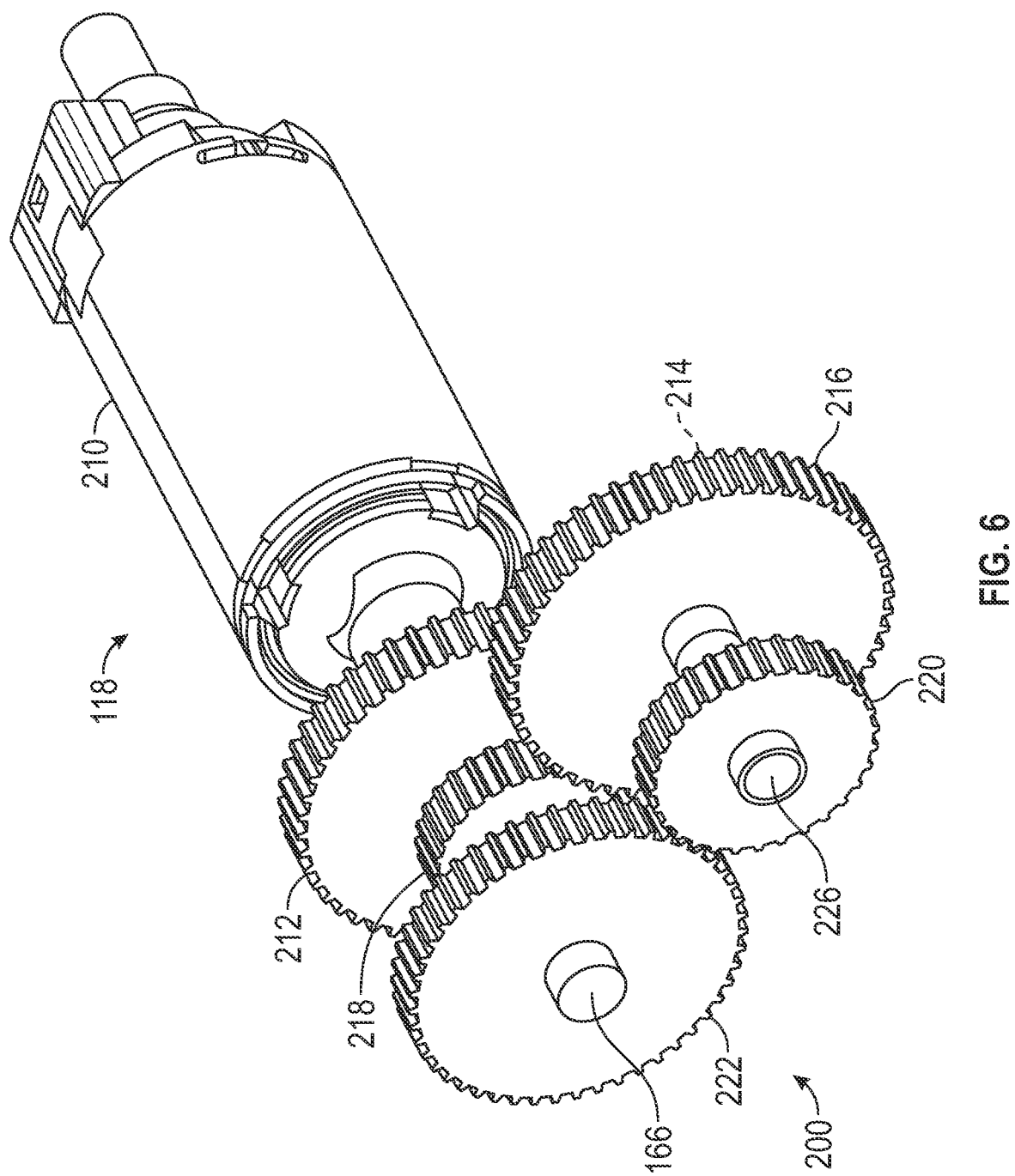

SYSTEMS AND METHODS FOR FLIPPING A SEAT OF A VEHICLE

CROSS REFERENCE TO RELATED APPLICATIONS

This application claims the benefit of Chinese Application No. 202410081227.7, filed Jan. 19, 2024 which is herein incorporated by reference in its entirety.

INTRODUCTION

The technical field generally relates to vehicle seats, and more particularly relates to methods and systems for flipping a seat in a vehicle.

Contemporary automobiles offer a range of amenities designed to enhance the comfort of their occupants. Examples of these features include adjustable seats that can be customized to accommodate specific occupants, including adjustments for seat height, recline angle, lumbar support, and headrest height. Other comfort features may involve seats with temperature control and extendable seat cushions. Such enhancements contribute to an elevated user experience and increased customer satisfaction.

Accordingly, it is desirable to provide systems and methods capable of promoting occupant comfort while in a vehicle. Furthermore, other desirable features and characteristics of the present disclosure will become apparent from the subsequent detailed description and the appended claims, taken in conjunction with the accompanying drawings and the foregoing introduction.

SUMMARY

A method is provided for flipping a seat of a vehicle. In one example, the method includes providing a base member for the seat, providing a drive mechanism partially used for driving the base member to rotate around a first axis in a horizontal direction left and right relative to a seat occupant, wherein the first axis is centrally located in the base member, providing a first support member and a second support member of the seat, wherein a lower end of one side of the first support member is rotatably connected to an output end of the drive mechanism for driven rotation, and a lower end of the second support member is rotatably connected to an upper end of the first support member, providing a backrest member, whose left and right sides are located within the second support member and are rotatably connected with the second support member in a horizontal direction along a second axis, wherein the second axis is centrally positioned in the backrest member, providing a lock mechanism for locking and unlocking the backrest member with the second support member, providing a rotation mechanism, receiving, by a control module, a command to flip the seat, and activating, with the control module, the drive mechanism to rotate the first support member by a predetermined angle, and to rotate the base member in the same clockwise direction, wherein the rotation mechanism causes the second support member to rotate counterclockwise relative to the first support member, triggering the lock mechanism to unlock during rotation, and causing the backrest member to rotate 180° relative to the second support member before re-triggering the lock mechanism to lock the backrest member with the second support member, wherein the first support member, the second support member and the base member rotate synchronously, completing the flip of the seat to allow the occupant to sit in the opposite direction.

In various examples, the rotation mechanism in the method is configured on the same side as the output end of the drive mechanism, including a first four-bar mechanism configured on the first support member and a second four-bar mechanism configured on the second support member, wherein a lower end of the first four-bar mechanism is drivably connected to the output end of the drive mechanism to drive the first support member to rotate and the second support member to rotate relative to the first support member, wherein a lower end of the second four-bar mechanism is drivably connected to an upper end of the first four-bar mechanism to trigger the lock mechanism and drive the backrest member to rotate relative to the second support member, and wherein an upper end of the second four-bar mechanism is drivably connected to the backrest member to facilitate its rotation relative to the second support member.

In various examples, in the method, a wheel member having a groove is configured at the lower end of the second four-bar mechanism, a fixed gear member is configured at the upper end of the first four-bar mechanism, and a connecting gear member having a pin is configured between the wheel member and the fixed gear member, enabling the fixed gear member to drive the rotation of the connecting gear member and in turn, drive the rotation of the wheel member through the interlocking of the pin and groove, wherein a first gear member is configured at the upper end of the second four-bar mechanism, and a second gear member is configured on the backrest member, enabling the second four-bar mechanism to drive the rotation of the backrest member relative to the second support member.

In various examples, the lock mechanism in the method includes a lock main body member configured on the second support member, a matching member at both ends of the backrest member that can engage with the lock main body member, and an actuating member fixed relative to the axis of the connecting gear member.

In various examples, the drive mechanism in the method includes a motor and a gear set connected to an output end of the motor, wherein the gear set provides a first power output gear for driving the rotation of the first support member, and a second power output gear to drive the rotation of the second support member relative to the first support member through the first four-bar mechanism.

In various examples, the drive mechanism in the method further includes a housing member with the motor and gear set configured inside it, and the upper surface of the housing member partially overlaps with the lower surface of the base member when the seat is in a stationary state.

In various examples, the method includes generating the command in response to the individual interacting with a human interface device of the vehicle.

A system is provided for flipping a seat in a vehicle. In one example, the system includes a base member for the seat, a drive mechanism partially used for driving the base member to rotate around a first axis in a horizontal direction left and right relative to a seat occupant, wherein the first axis is centrally located in the base member, a first support member and a second support member of the seat, wherein a lower end of one side of the first support member is rotatably connected to an output end of the drive mechanism for driven rotation, and a lower end of the second support member is rotatably connected to an upper end of the first support member, a backrest member, whose left and right sides are located within the second support member and are rotatably connected with the second support member in a horizontal direction along a second axis, wherein the second axis is centrally positioned in the backrest member, a lock mechanism for locking and unlocking the backrest member with the second support member, a rotation mechanism, and a control module for sending a command to flip the seat, wherein the drive mechanism is activated by the command to rotate the first support member by a predetermined angle, and to rotate the base member in the same clockwise direction, wherein the rotation mechanism causes the second support member to rotate counterclockwise relative to the first support member, triggering the lock mechanism to unlock during rotation, and causing the backrest member to rotate 180° relative to the second support member before re-triggering the lock mechanism to lock the backrest member with the second support member, wherein the first support member, the second support member and the base member rotate synchronously, completing the flip of the seat to allow the occupant to sit in the opposite direction.

In various examples, the rotation mechanism of the system is configured on the same side as the output end of the drive mechanism, including a first four-bar mechanism configured on the first support member and a second four-bar mechanism configured on the second support member, wherein a lower end of the first four-bar mechanism is drivably connected to the output end of the drive mechanism to drive the first support member to rotate and the second support member to rotate relative to the first support member, wherein a lower end of the second four-bar mechanism is drivably connected to an upper end of the first four-bar mechanism to trigger the lock mechanism and drive the backrest member to rotate relative to the second support member, and wherein an upper end of the second four-bar mechanism is drivably connected to the backrest member to facilitate its rotation relative to the second support member.

In various examples, a wheel member having a groove is configured at the lower end of the second four-bar mechanism of the system, a fixed gear member is configured at the upper end of the first four-bar mechanism, and a connecting gear member having a pin is configured between the wheel member and the fixed gear member, enabling the fixed gear member to drive the rotation of the connecting gear member and in turn, drive the rotation of the wheel member through the interlocking of the pin and groove, wherein a first gear member is configured at the upper end of the second four-bar mechanism, and a second gear member is configured on the backrest member, enabling the second four-bar mechanism to drive the rotation of the backrest member relative to the second support member.

In various examples, the lock mechanism of the system includes a lock main body member configured on the second support member, a matching member at both ends of the backrest member that can engage with the lock main body member, and an actuating member fixed relative to the axis of the connecting gear member.

In various examples, the drive mechanism of the system includes a motor and a gear set connected to an output end of the motor, wherein the gear set provides a first power output gear for driving the rotation of the first support member, and a second power output gear to drive the rotation of the second support member relative to the first support member through the first four-bar mechanism.

In various examples, the drive mechanism of the system includes a housing member with the motor and gear set configured inside it, and the upper surface of the housing member partially overlaps with the lower surface of the base member when the seat is in a stationary state.

In various examples, the system includes a human interface device of the vehicle for entering the command.

A vehicle is provided that, in one example, includes a vehicle body and a system for flipping a seat in the vehicle. The system of the vehicle includes a base member for the seat, a drive mechanism partially used for driving the base member to rotate around a first axis in a horizontal direction left and right relative to a seat occupant, wherein the first axis is centrally located in the base member, a first support member and a second support member of the seat, wherein a lower end of one side of the first support member is rotatably connected to an output end of the drive mechanism for driven rotation, and a lower end of the second support member is rotatably connected to an upper end of the first support member, a backrest member, whose left and right sides are located within the second support member and are rotatably connected with the second support member in a horizontal direction along a second axis, wherein the second axis is centrally positioned in the backrest member, a lock mechanism for locking and unlocking the backrest member with the second support member, a rotation mechanism, a control module for sending a command to flip the seat, and, a human interface device of the vehicle for entering the command, wherein the drive mechanism is activated by the command to rotate the first support member by a predetermined angle, and to rotate the base member in the same clockwise direction, wherein the rotation mechanism causes the second support member to rotate counterclockwise relative to the first support member, triggering the lock mechanism to unlock during rotation, and causing the backrest member to rotate 180° relative to the second support member before re-triggering the lock mechanism to lock the backrest member with the second support member, wherein the first support member, the second support member and the base member rotate synchronously, completing the flip of the seat to allow the occupant to sit in the opposite direction.

In various examples, the rotation mechanism of the system in the vehicle is configured on the same side as the output end of the drive mechanism, including a first four-bar mechanism configured on the first support member and a second four-bar mechanism configured on the second support member, wherein a lower end of the first four-bar mechanism is drivably connected to the output end of the drive mechanism to drive the first support member to rotate and the second support member to rotate relative to the first support member, wherein a lower end of the second four-bar mechanism is drivably connected to an upper end of the first four-bar mechanism to trigger the lock mechanism and drive the backrest member to rotate relative to the second support member; and wherein an upper end of the second four-bar mechanism is drivably connected to the backrest member to facilitate its rotation relative to the second support member.

In various examples, a wheel member having a groove is configured at the lower end of the second four-bar mechanism of the system in the vehicle, a fixed gear member is configured at the upper end of the first four-bar mechanism, and a connecting gear member having a pin is configured between the wheel member and the fixed gear member, enabling the fixed gear member to drive the rotation of the connecting gear member and in turn, drive the rotation of the wheel member through the interlocking of the pin and groove, wherein a first gear member is configured at the upper end of the second four-bar mechanism, and a second gear member is configured on the backrest member, enabling the second four-bar mechanism to drive the rotation of the backrest member relative to the second support member.

In various examples, the lock mechanism of the system in the vehicle includes a lock main body member configured on the second support member, a matching member at both ends of the backrest member that can engage with the lock main body member, and an actuating member fixed relative to the axis of the connecting gear member.

In various examples, the drive mechanism of the vehicle includes a motor and a gear set connected to an output end of the motor, wherein the gear set provides a first power output gear for driving the rotation of the first support member, and a second power output gear to drive the rotation of the second support member relative to the first support member through the first four-bar mechanism.

In various examples, the drive mechanism of the vehicle includes a housing member with the motor and gear set configured inside it, and the upper surface of the housing member partially overlaps with the lower surface of the base member when the seat is in a stationary state.

BRIEF DESCRIPTION OF THE DRAWINGS

The exemplary embodiments will hereinafter be described in conjunction with the following drawing figures, wherein like numerals denote like elements, and wherein:

FIG. 5 is a simplified left view of the system for flipping a seat in a vehicle of FIG. 2, showing its initial and final positions, in accordance with an example;

FIG. 6 is a perspective view of a drive mechanism of the system for flipping a seat in a vehicle of FIG. 2 in accordance with an example;

DETAILED DESCRIPTION

The following detailed description is merely exemplary in nature and is not intended to limit the application and uses. Furthermore, there is no intention to be bound by any expressed or implied theory presented in the preceding introduction or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Examples of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples of the present disclosure may be practiced in conjunction with any number of systems, and that the systems described herein is merely examples of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example of the present disclosure.

Figure 1:
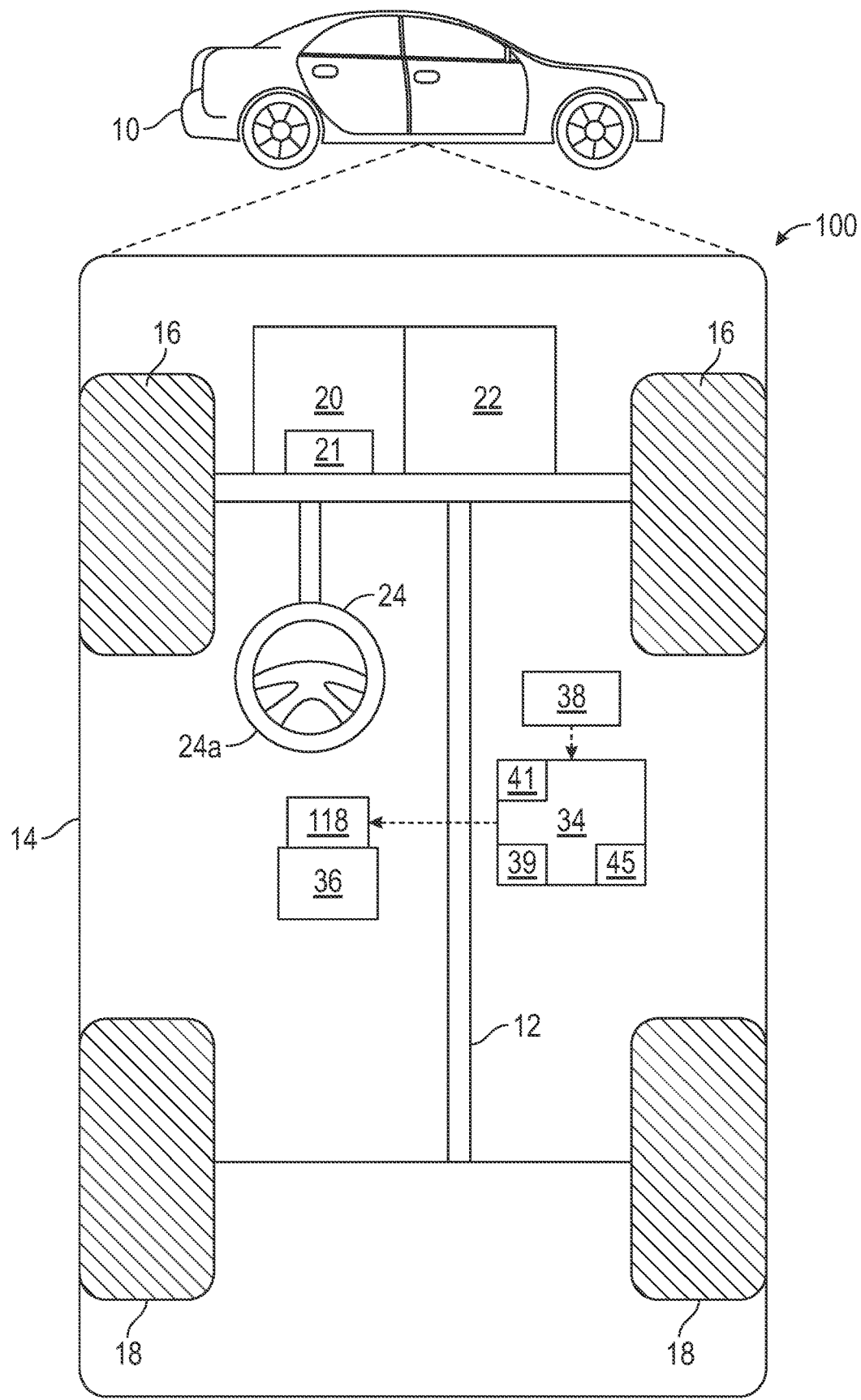
FIG. 1 is functional block diagram of a vehicle that includes a system for flipping a seat in a vehicle in accordance with an example.

FIG. 1 illustrates a vehicle 10, according to an example. In certain examples, the vehicle 10 comprises an automobile. The vehicle 10 includes a system 100 for flipping a seat in the vehicle.

In various examples, the vehicle 10 may be any one of a number of different types of automobiles, such as, for example, a sedan, a wagon, a truck, or a sport utility vehicle (SUV), and may be two-wheel member drive (2WD) (i.e., rear-wheel member drive or front-wheel member drive), four-wheel member drive (4WD) or all-wheel member drive (AWD), and/or various other types of vehicles or mobile platforms in certain examples.

As depicted in FIG. 1, the exemplary vehicle 10 generally includes a chassis 12, a body 14, front wheel members 16, and rear wheel members 18. The body 14 is arranged on the chassis 12 and substantially encloses components of the vehicle 10. The body 14 and the chassis 12 may jointly form a frame. The wheel members 16-18 are each rotationally coupled to the chassis 12 near a respective corner of the body 14.

The vehicle 10 further includes a propulsion system 20, a transmission system 22, a steering system 24, at least one control module 34, a drive mechanism 118, a seat 36, and a human interface device 38. The propulsion system 20 includes an engine and/or motor 21 such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheel members 16-18 according to selectable speed ratios. According to various examples, the transmission system 22 may include a step-ratio automatic transmission, a continuously-variable transmission, or other appropriate transmission. The steering system 24 influences a position of the wheel members 16-18. While depicted as including a steering wheel member 24a for illustrative purposes, in some examples contemplated within the scope of the present disclosure, the steering system 24 may not include the steering wheel member 24a.

The control module 34 may include a processor 39, a communication bus 41, and a computer readable storage device or media 45. The processor 39 performs the computation and control functions of the control module 34. The processor 39 may be any custom made or commercially available processor, a central processing unit (CPU), a graphics processing unit (GPU), an auxiliary processor among several processors associated with the control module 34, a semiconductor-based microprocessor (in the form of a microchip or chip set), a macroprocessor, any combination thereof, or generally any device for executing instructions. The computer readable storage device or media 45 may include volatile and nonvolatile storage in read-only memory (ROM), random-access memory (RAM), and keep-alive memory (KAM), for example. KAM is a persistent or nonvolatile memory that may be used to store various operating variables while the processor 39 is powered down. The computer-readable storage device or media 45 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the control module 34 in controlling the vehicle 10. The bus 41 serves to transmit programs, data, status and other information or signals between the various components of the vehicle 10. The bus 41 may be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 39, receive and process signals from the sensor system (not shown), perform logic, calculations, methods and/or algorithms, and generate data based on the logic, calculations, methods, and/or algorithms. Although only one control module 34 is shown in FIG. 1, examples of the vehicle 10 may include any number of control modules 34 that communicate over any suitable communication medium or a combination of communication mediums and that cooperate to process the sensor signals, perform logic, calculations, methods, and/or algorithms, and generate data.

As may be appreciated, the control module 34 may otherwise differ from the example depicted in FIG. 1. For example, the control module 34 may be coupled to or may otherwise utilize one or more remote computer systems and/or other control systems, for example as part of one or more of the above-identified vehicle devices and systems. It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 39) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the control module 34 may also otherwise differ from the example depicted in FIG. 1, for example in that the computer system of the control module 34 may be coupled to or may otherwise utilize one or more remote computer systems and/or other control systems.

Figure 2:
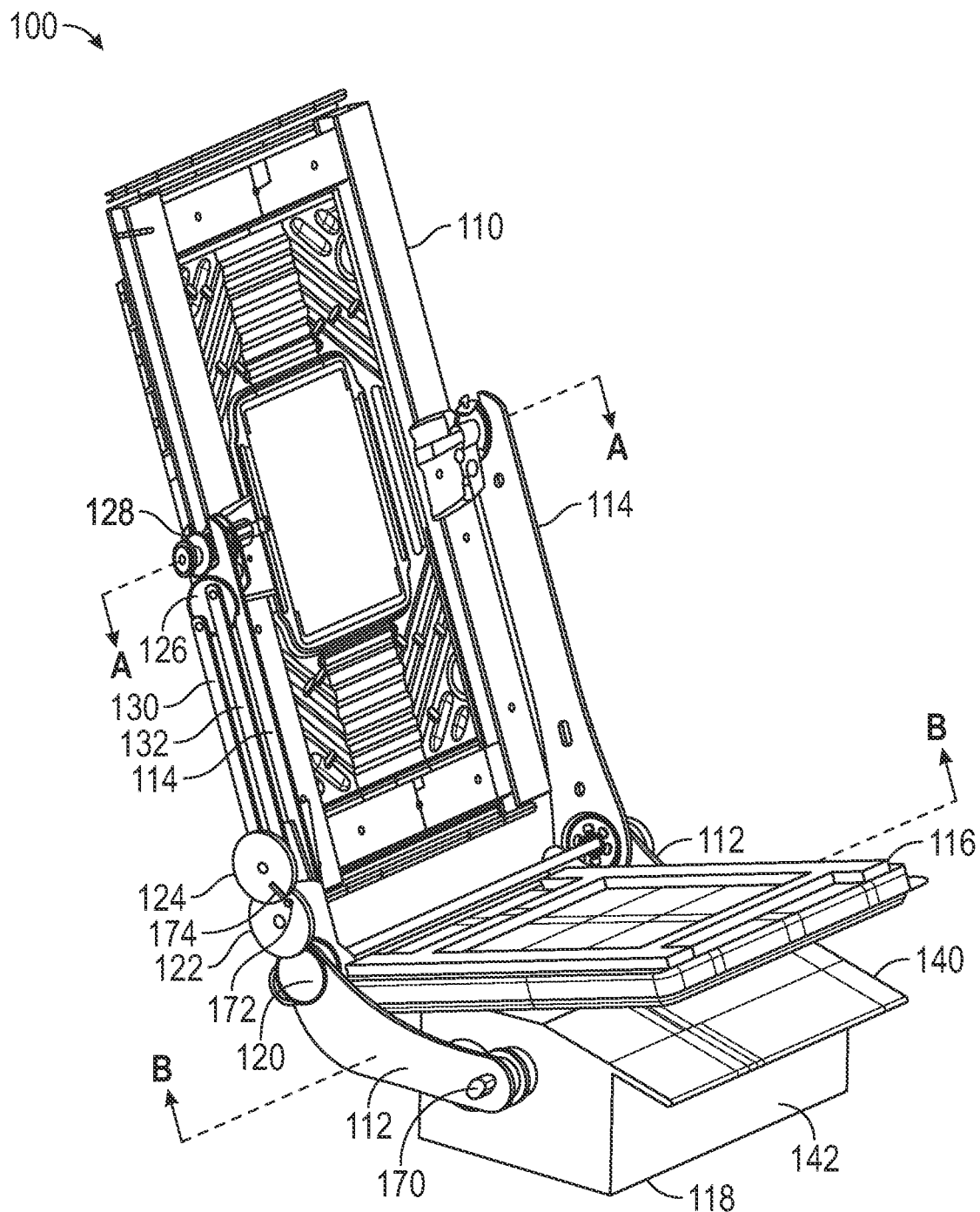
FIG. 2 is a perspective view of a system for flipping a seat in a vehicle of FIG. 1 in accordance with an example.
Figure 3:
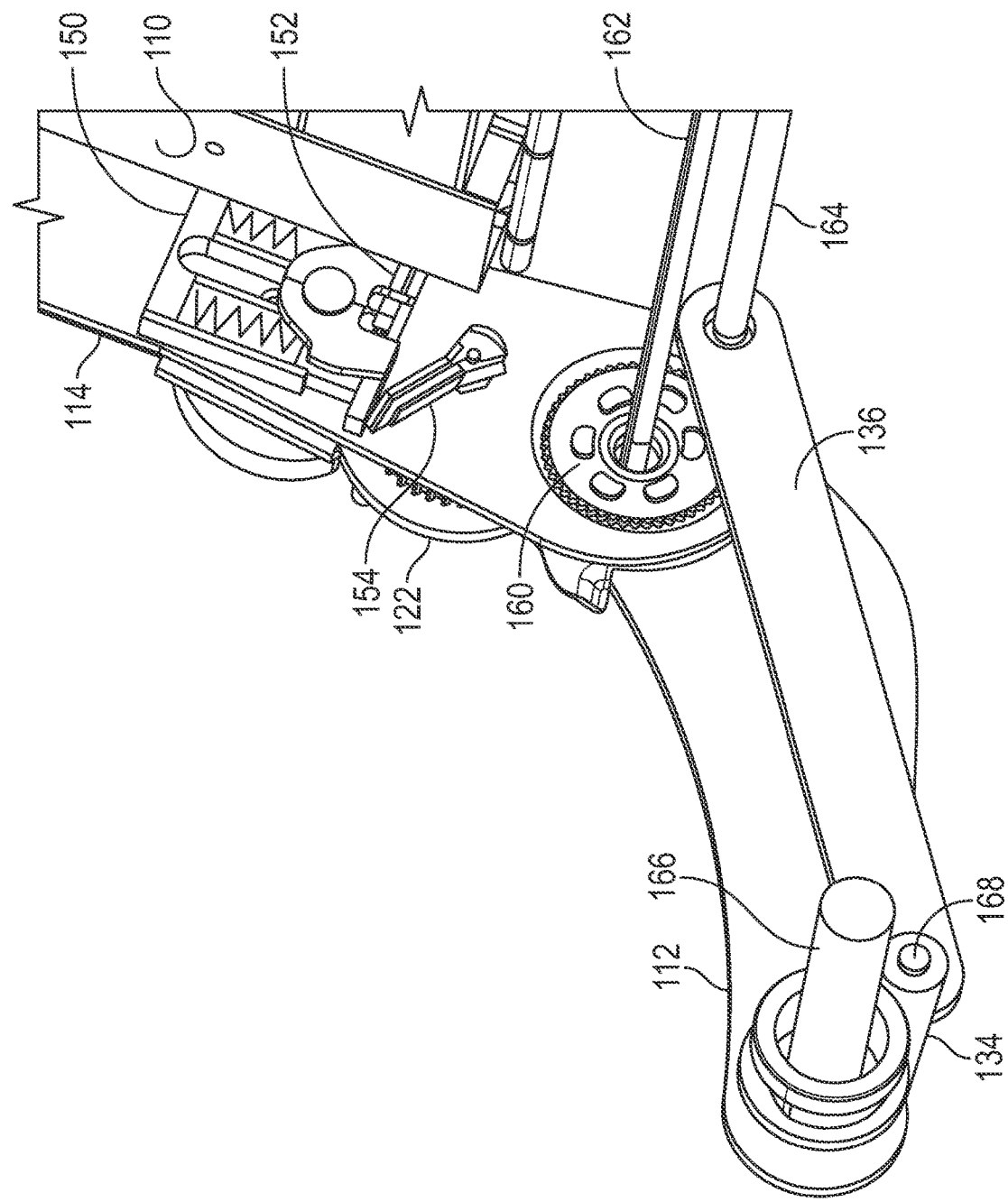
FIG. 3 is a perspective view illustrating partial components of the system for flipping a seat in a vehicle of FIG. 2 in accordance with an example.
Figure 4:
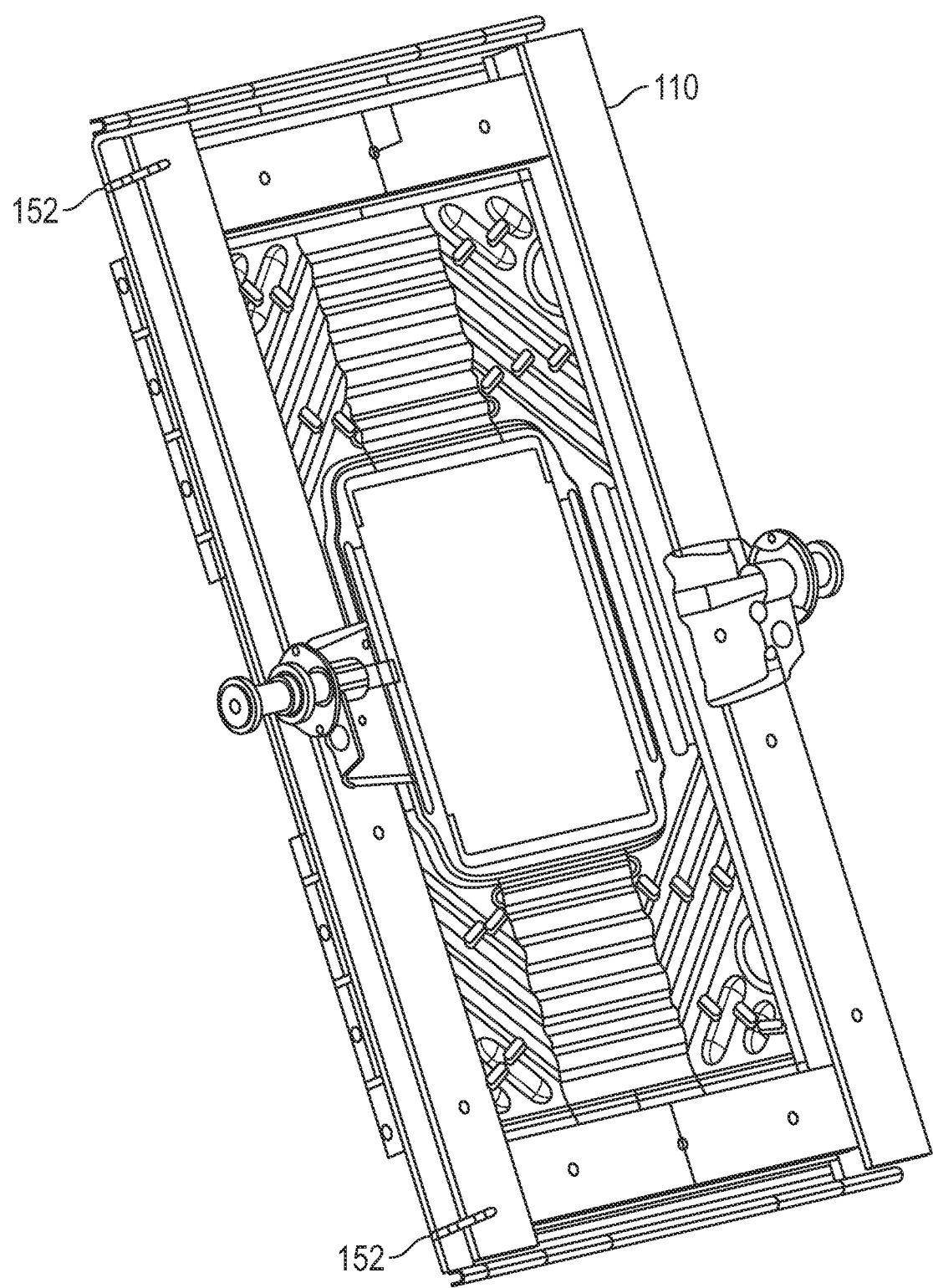
FIG. 4 is a perspective view of a backrest member of the system for flipping a seat in a vehicle of FIG. 2 in accordance with an example.

FIGS. 2-4 present various aspects of a system 100 for flipping a seat in a vehicle in one nonlimiting example. System 100 includes a drive mechanism 118, a first support member 112, a second support member 114, a backrest member 110, and a base member 116. In various examples, system 100 also includes a lock mechanism to lock and unlock the backrest member 110 with the second support member 114, a rotation mechanism, and a control module (not shown).

In various examples, the first support member 112 and the second support member 114 are each positioned on either side of the seat and are rotatably connected through bearings 160 and a rod 164. The second support member 114 is located on the outside of the backrest member 110 and is rotatably connected along the AA axis (indicated by the arrowed dashed line in FIG. 2) to the backrest member 110. The AA axis is horizontal and parallel to the left and right directions of an occupant sitting in the seat. In some examples, the connection point of the second support member 114 with the backrest member 110 is located at the center of the backrest member 110.

In various examples, the lower end of one side of the first support member 112 is drivably connected to an output end 170 of the drive mechanism 118, allowing it to be driven by the drive mechanism 118 and rotate a predetermined angle along the direction of the drive shaft 166. According to the command from the control module, the first support member 112 can rotate along the drive shaft 166 in a clockwise or opposite direction. The base member 116 is drivably connected to the drive mechanism 118, enabling it to be driven and rotate in the direction of the BB axis (indicated by the arrowed dashed line in FIG. 2). In some examples, the rotation axis BB is located at the center of the base member 116.

In various examples, the rotation mechanism is configured on the same side as the output end 170. It includes a first four-bar mechanism configured on the first support member 112 and a second four-bar mechanism configured on the second support member 114. The lower end of the first four-bar mechanism is drivably connected to the output end 170 to drive the first support member 112 to rotate, and to drive the second support member 114 to rotate relative to the first support member 112. The lower end of the second four-bar mechanism is drivably connected to the upper end of the first four-bar mechanism to trigger the lock mechanism and drive the backrest member 110 to rotate relative to the second support member 114. The upper end of the second four-bar mechanism is drivably connected to the backrest member 110 to facilitate its rotation relative to the second support member 114.

In some examples, the first four-bar mechanism includes a bar 134 and another bar 136. One end of bar 134 is drivably connected to the output end 170, and its other end is rotatably connected to one end of bar 136 via an axis 168 (as shown in FIG. 3). The other end of bar 136 is rotatably connected near the base of the second support member 114, close to the backrest member 110, through rod 164. When the output end 170 of the drive mechanism 118 drives bar 134 to rotate relative to the first support member 112, bar 136 drives the second support member 114 to rotate relative to the first support member 112 along the axis of rod 162, following the principle of the four-bar mechanism.

In some examples, the second four-bar mechanism includes a bar 130, a bar 132, a first gear member 126, and a wheel member 124 with a groove 174 (as shown in FIG. 2). The first gear member 126 and the wheel member 124 are both configured on the same side of the second support member 114 and can rotate relative to it. One end of bar 130 and bar 132 is rotatably connected to the same side of the first gear member 126, and their other ends are rotatably connected to the same side of the wheel member 124. In some examples, bar 130 and bar 132 can connect to the inside (as shown in FIG. 2) or the outside of the wheel member 124.

In some examples, the rotation mechanism also includes a fixed gear member 120 configured on and fixedly connected to the first support member 112, a connecting gear member 122 on the second support member 114, and a second gear member 128 fixedly connected to the backrest member 110 (as shown in FIG. 2). The connecting gear member 122 has a pin 172 on one side and is configured between the wheel member 124 and the fixed gear member 120. When the second support member 114 rotates relative to the first support member 112, the fixed gear member 120 drives the connecting gear member 122 in the opposite direction. After the connecting gear member 122 rotates a specific angle, its pin 172 engages with the groove 174 on the wheel member 124, driving it in the opposite direction. In some examples, by adjusting the gear radii of the fixed gear member 120, the connecting gear member 122, and the wheel member 124, their rotation rates can be the same. When the wheel member 124 rotates, bar 130 and bar 132 drive the first gear member 126 to rotate via the four-bar mechanism principle. In turn, the first gear member 126 drives the second gear member 128 and the backrest member 110 to rotate in the opposite direction.

In some examples, the lock mechanism includes a lock main body member 150, a matching member 152, and an actuating member 154 (as shown in FIG. 3). The main body member 150 is configured near one side of the backrest member 110. In some examples, the main body member 150 may include a spring component and a movable part connected to the spring. Before the spring is compressed to a critical point by the actuating member 154, the movable part engages with the matching member 152, preventing its movement. When the spring is compressed to the critical point, the movable part disengages from the matching member 152, allowing movement. The actuating member 154, configured on the same side as the main body member 150, is fixedly connected to the rotating axis of the connecting gear member 122, allowing it to be driven and rotate around the axis. The matching member 152 is configured at both ends of the backrest member 110 near the second support member 114 (as shown in FIG. 4). When the backrest member 110 is parallel to the second support member 114, the matching member 152 engages with the main body member 150, preventing the backrest member 110 from rotating relative to the second support member 114. The shapes and components of the main body member 150, the actuating member 154, and the matching member 152 are not limited to those shown in FIGS. 3-4 and can be of any other shape (e.g., the actuating member 154 can be a rod or pin) or component (e.g., the main body member 150 may not include a spring).

FIG. 5 presents a simplified left view of system 100 from FIG. 2, showing its initial and final positions. When the backrest member 110 is on the left, system 100 is in its initial position. Upon receiving a command to flip the seat, the first support member 112 rotates around the drive shaft at the output end 170 to the final position on the right. The drive mechanism 118 is fixed relative to the vehicle's main body. During the rotation of the first support member 112 from the initial to the final position, the base member 116 is driven by the drive mechanism 118 to rotate around the BB axis. There is no direct connection between the base member 116 and the first support member 112, and they rotate at their own rates in the same clockwise direction during the seat flipping process. The first support member 112, the second support member 114, the base member 116, and the backrest member 110 exhibit vertical mirror symmetry around the output end 170 in both the initial and final positions of the seat flip. In various examples, the flip of system 100 is reversible. That is, when it is in the final position, upon receiving a new command, these components can automatically flip back to the initial position and this process can be repeated indefinitely, allowing the occupant to sit facing the opposite direction. The reversible seat can be located in the second row of the vehicle or in other positions.

Figure 5A:
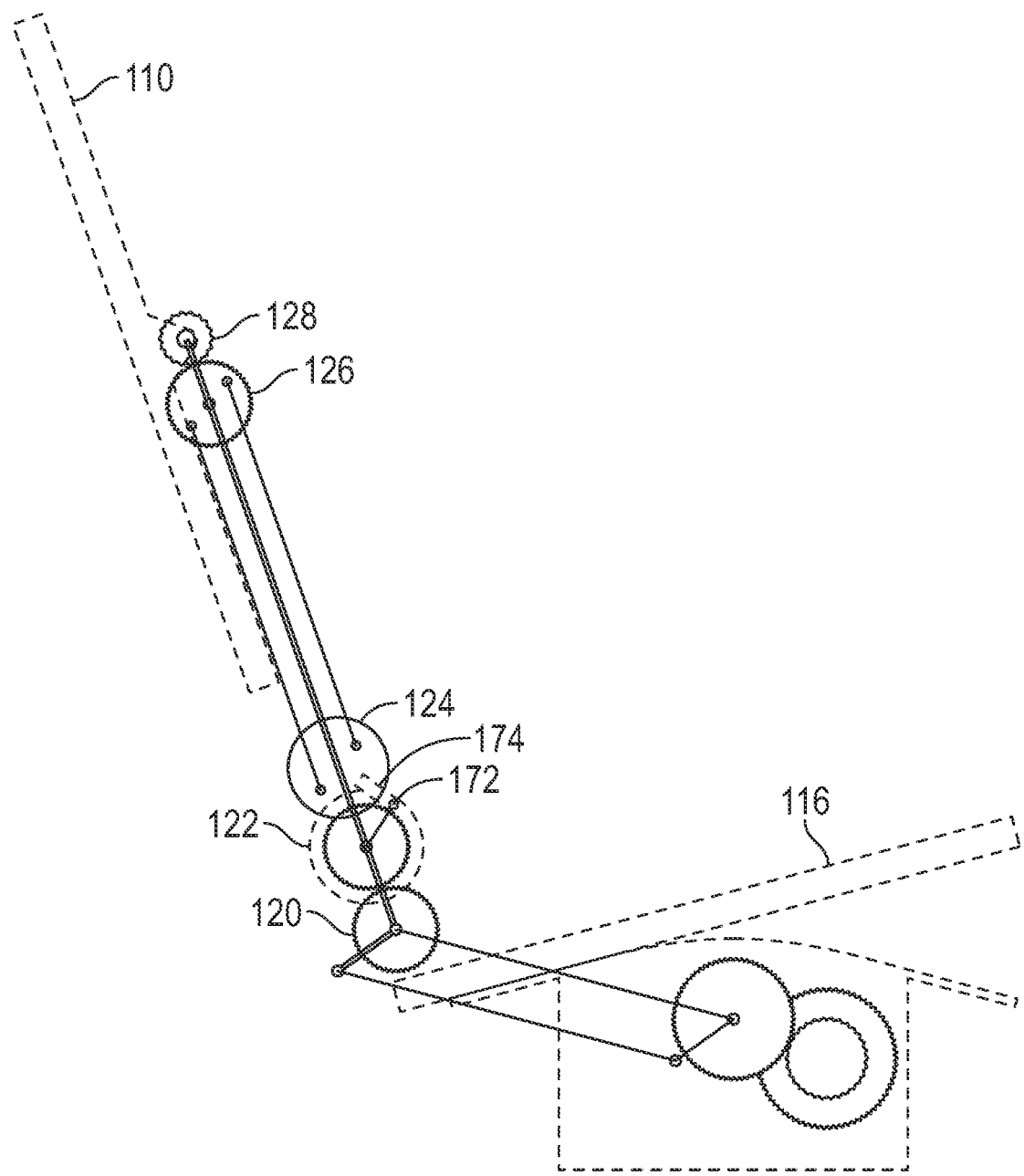
FIG. 5A is a simplified left view of the system for flipping a seat in a vehicle of FIG. 2, showing partial components at its initial position, in accordance with an example.

Referencing FIGS. 5A-5E and continuing from FIGS. 1-4, a simplified left view of system 100 illustrates the component positions at various critical states during the flipping process. FIG. 5A shows system 100 in its initial position. Here, the pin 172 on the connecting gear member 122 has not yet contacted the groove 174 on the wheel member 124, so when the connecting gear member 122, driven counterclockwise by the fixed gear member 120, rotates, the wheel member 124 remains stationary relative to the second support member 114. Simultaneously, the actuating member 154 (as shown in FIG. 3) rotates in sync with the connecting gear member 122, beginning to apply force to the lock main body member 150, but not yet triggering the unlock, thus keeping the backrest member 110 stationary relative to the second support member 114. The base member 116 begins to rotate around the BB axis.

Figure 5B:
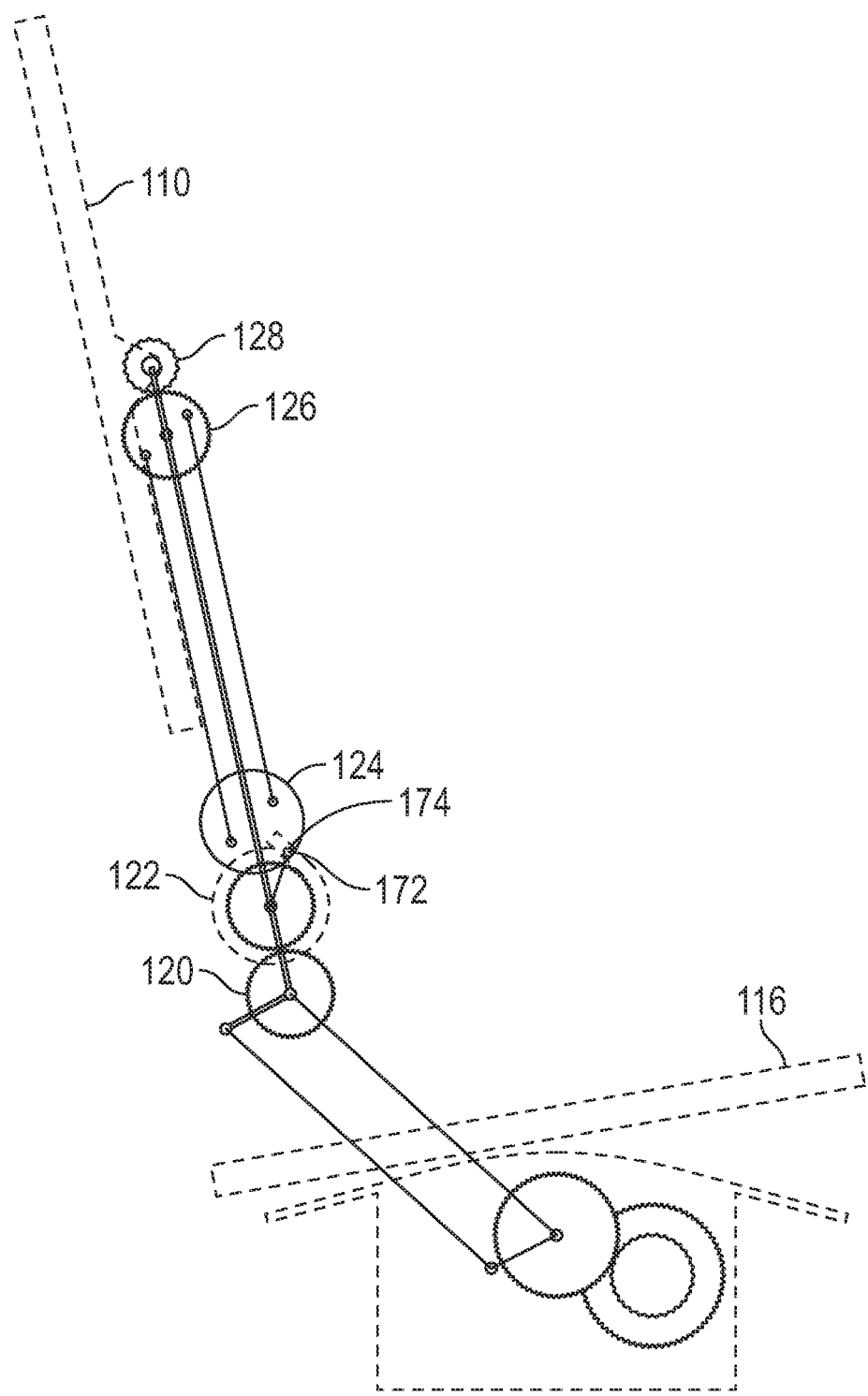
FIG. 5B is a simplified left view of the system for flipping a seat in a vehicle of FIG. 2, showing partial components at a critical state during the flipping process, in accordance with an example.

FIG. 5B shows system 100 entering the first critical state during the flipping process from its initial position. In this state, pin 172 begins to engage and mesh with groove 174. Simultaneously, the actuating member 154 triggers the lock mechanism to unlock, releasing the matching member 152 from the main body member 150, allowing the backrest member 110 to rotate relative to the second support member 114. After passing the first critical state, the connecting gear member 122 starts driving the wheel member 124 in the opposite clockwise direction, thereby rotating the backrest member 110 clockwise relative to the second support member 114 via the second four-bar mechanism. The base member 116 continues its rotation around the BB axis and has rotated a specific angle compared to its initial position.

Figure 5C:
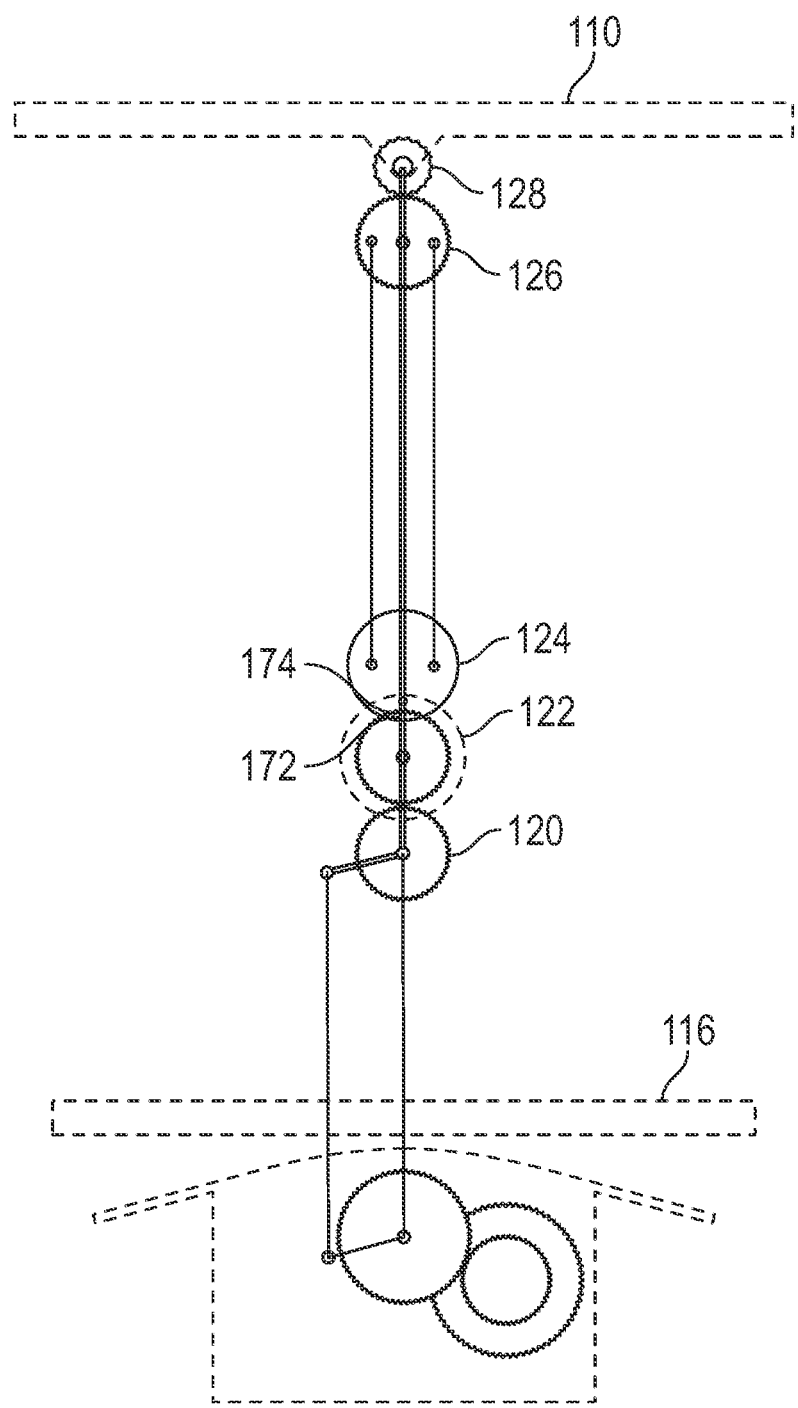
FIG. 5C is a simplified left view of the system for flipping a seat in a vehicle of FIG. 2, showing partial components at another critical state during the flipping process, in accordance with an example.

FIG. 5C shows system 100 entering the second critical state during its flipping process from the first critical state. In this state, pin 172 remains engaged with groove 174. The backrest member 110 continues rotating and reaches a vertical position relative to the second support member 114. The base member 116 continues its rotation, completing half of the total rotational angle. In one example, the surface of the base member 116 is parallel to the horizontal plane.

Figure 5D:
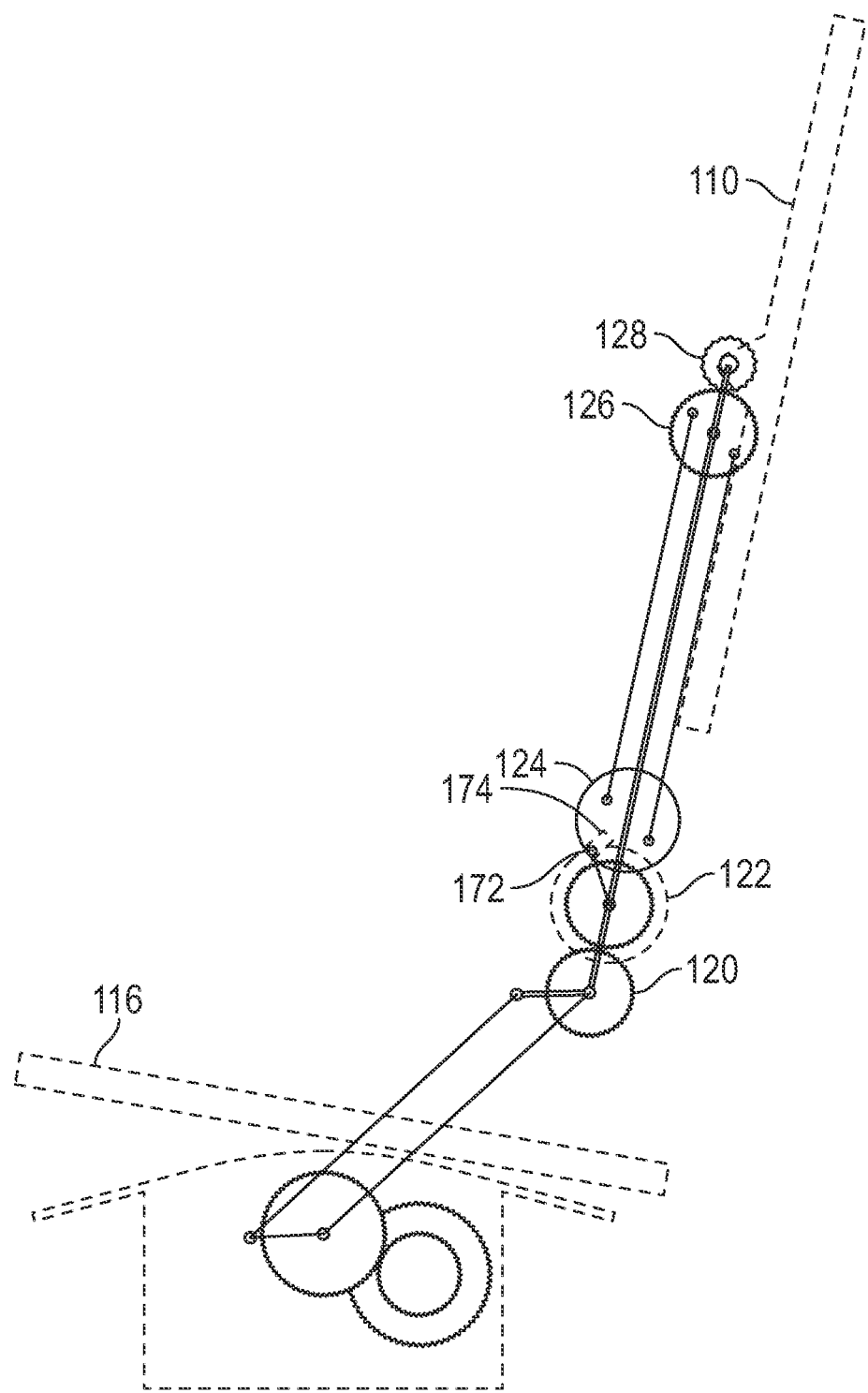
FIG. 5D is a simplified left view of the system for flipping a seat in a vehicle of FIG. 2, showing partial components at another critical state during the flipping process, in accordance with an example.

FIG. 5D shows system 100 entering the third critical state during its flipping process from the second critical state. In this state, pin 172 begins to disengage from groove 174. Simultaneously, the actuating member 154 triggers the lock mechanism to lock, with the matching member 152 blocked by the main body member 150, preventing further rotation of the backrest member 110 relative to the second support member 114. Thus, the backrest member 110 completes a 180-degree rotation relative to the second support member 114. After passing the third critical state, the connecting gear member 122 stops driving the wheel member 124, halting the second four-bar mechanism. The base member 116 continues rotating around the BB axis, having rotated a specific angle compared to the second critical state.

Figure 5E:
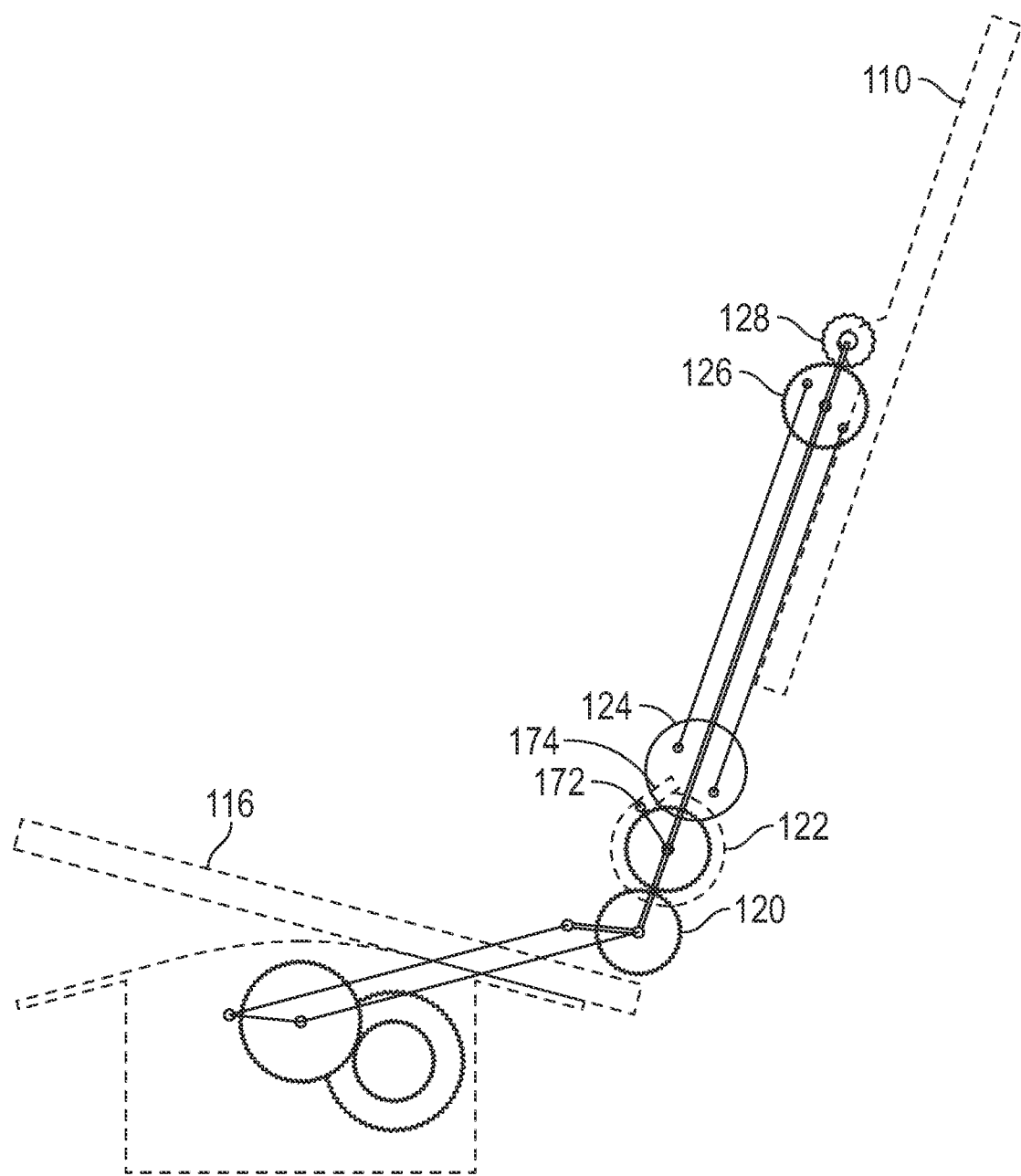
FIG. 5E is a simplified left view of the system for flipping a seat in a vehicle of FIG. 2, showing partial components at its final position, in accordance with an example.

FIG. 5E shows system 100 entering the final position from the third critical state. During the rotation from the third critical state to the final position, pin 172 remains disengaged from groove 174. The actuating member 154, rotating synchronously with the connecting gear member 122, gradually reduces and then ceases its force on the lock main body member 150, thus not triggering unlocking. The backrest member 110 remains stationary relative to the second support member 114. The base member 116 continues its rotation around the BB axis, completing its full rotational angle.

In some examples, the rotational angle from the initial position to the final position for the first support member 112 is defined as B. The rotational angle for the bar 134 from its initial position to the final position is C. The connecting gear member 122 rotates an angle D from the initial position to the first critical state and an angle E from the first critical state to the second critical state. When the drive radii of the fixed gear member 120, the connecting gear member 122, and the wheel member 124 are equal, these angles satisfy the equation: $B-C=2(D+E)$. In an example, B is 150 degrees.

FIG. 6 presents a perspective view of the drive mechanism 118 of system 100 from FIG. 2. The drive mechanism 118 includes a gear set 200 and a motor 210. The gear set 200 comprises a first power output gear 218, driving the first support member 112 around the axis of drive shaft 166, and a second power output gear 222, driving the second support member 114 relative to the first support member 112 through the first four-bar mechanism. The gear set also includes gears 212, 214 (not shown in FIG. 6, indicated only by dashed lines), 216, and 220, with gears 214, 216, and 220 sharing a drive shaft 226 for synchronized rotation. Gear 212 is fixedly connected to an output end of motor 210 for power reception. By controlling the radius and ratio of each gear in gear set 200, the rotation rates of the first support member 112 and second support member 114 can be controlled.

In some examples, the drive mechanism 118 includes a housing member 142. The gear set 200 and the motor 210 are positioned within the housing member 142. When the seat is either in the initial position or the final position, the upper surface 140 of the housing member 142 partially overlaps with the lower surface of the base member 116, thereby providing support for the occupant seated above.

Figure 7:
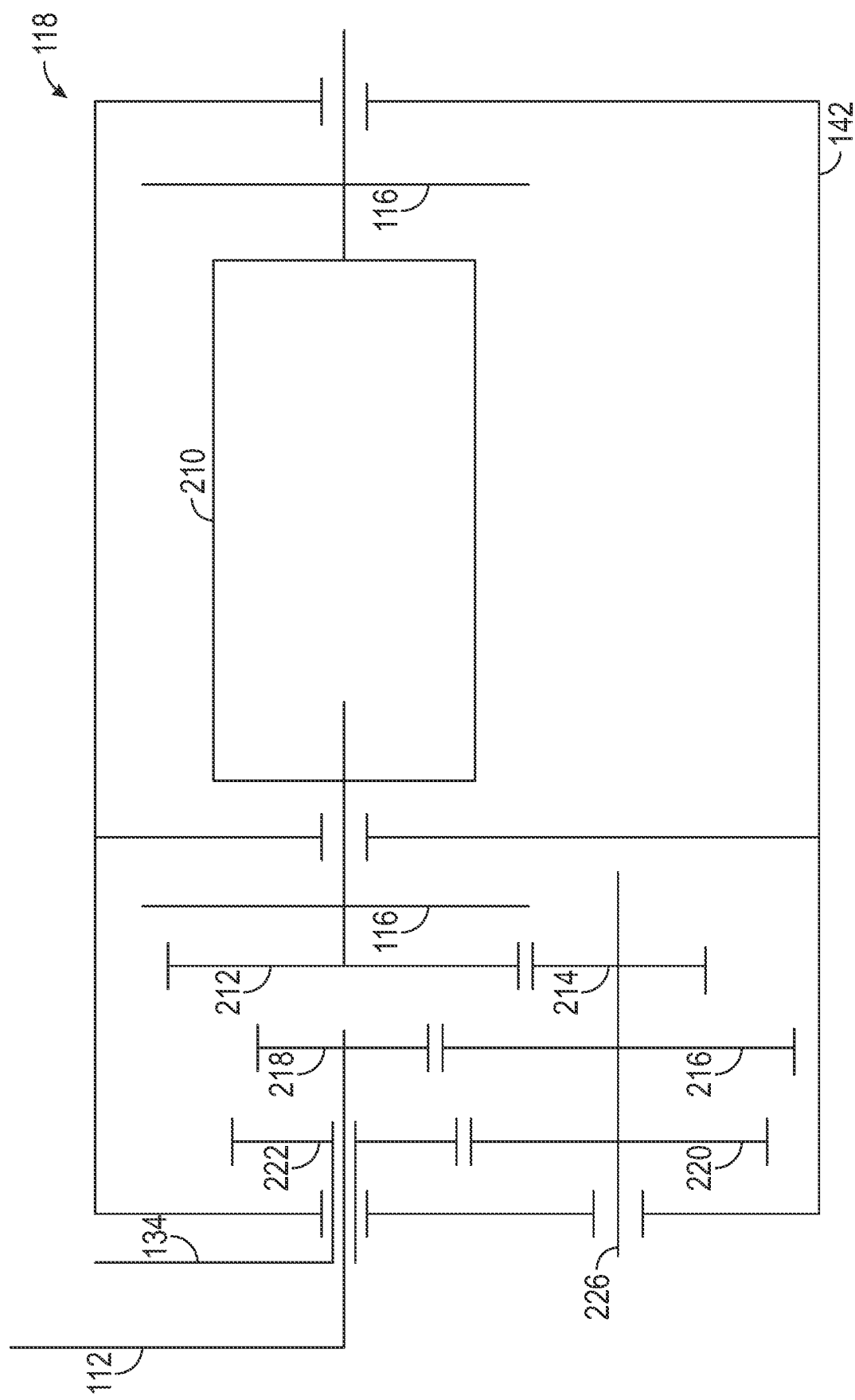
FIG. 7 is an illustration depicting the power transmission principle of the drive mechanism of FIG. 6 in accordance with an example.

FIG. 7 shows an illustration of the power transmission principle of the drive mechanism from FIG. 6. Gear 212, powered by motor 210, drives gears 214, 216, and 220 to rotate counterclockwise around drive shaft 226. Gear 216 drives the first power output gear 218 counterclockwise, while gear 220 similarly drives the second power output gear 222. The first power output gear 218 transmits its power to the first support member 112 via drive shaft 226, and the second power output gear 222 transmits power to bar 134 (as shown in FIG. 3) of the first four-bar mechanism. The drive shaft 226 can be designed with a dual-layer rotating structure for transmitting different rotation speeds, or with any other designs known in the art to achieve the same purpose. Additionally, the power output ends on both sides of motor 210 are connected to the base member 116 to drive its rotation.

Figure 8:
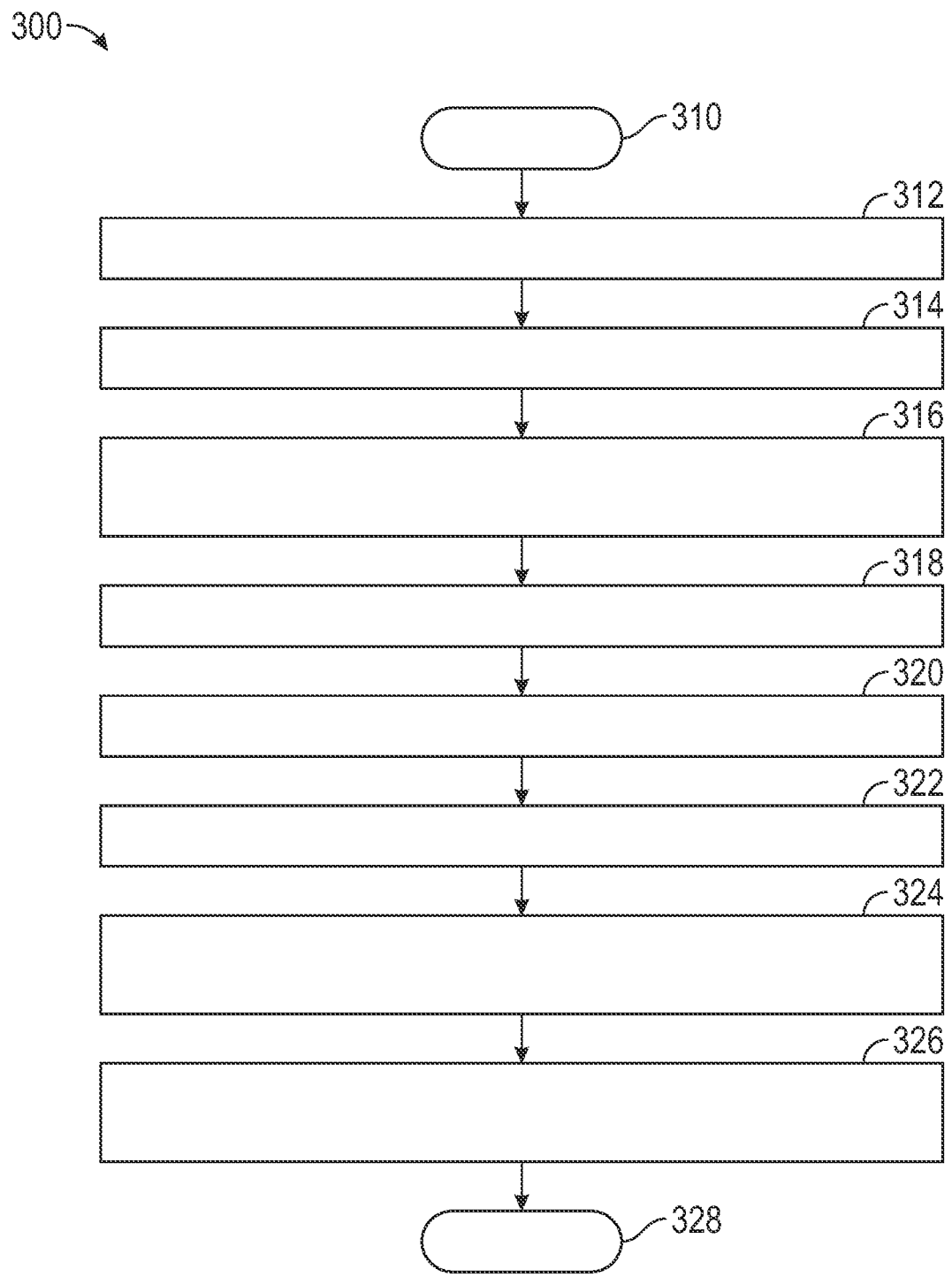
FIG. 8 is a flowchart illustrating a method for flipping a seat in a vehicle in accordance with an example.

With reference now to FIG. 8 and with continued reference to FIGS. 2-7, a flowchart provides a method 300 for flipping a seat in a vehicle as performed by the system 100, in accordance with various examples. As may be appreciated in light of the disclosure, the order of operation within the method 300 is not limited to the sequential execution as illustrated in FIG. 8, but may be performed in one or more varying orders as applicable and in accordance with the present disclosure.

In one example, the method 300 may start at 310. At 312, the method 300 may include providing a base member 116 for the seat. At 314, the method 300 may include providing a drive mechanism partially used for driving the base member 116 to rotate around a first axis in a horizontal direction left and right relative to a seat occupant seated in the seat, wherein the first axis is centrally located in the base member 116. At 316, the method 300 may include providing a first support member 112 and a second support member 114 of the seat, wherein a lower end of one side of the first support member 112 is rotatably connected to an output end of the drive mechanism for driven rotation, and a lower end of the second support member 114 is rotatably connected to an upper end of the first support member 112. At 318, the method 300 may include providing a backrest member 110, whose left and right sides are located within the second support member 114 and are rotatably connected with the second support member 114 in a horizontal direction along a second axis, wherein the second axis is centrally positioned in the backrest member 110. At 320, the method 300 may include providing a lock mechanism for locking and unlocking the backrest member 110 with the second support member 114. At 322, the method 300 may include providing a rotation mechanism. At 324, the method 300 may include receiving, by a control module, a command to flip the seat. At 326, the method 300 may include activating, with the control module, the drive mechanism to rotate the first support member 112 by a predetermined angle, and to rotate the base member 116 in the same clockwise direction, wherein the rotation mechanism causes the second support member 114 to rotate counterclockwise relative to the first support member 112, triggering the lock mechanism to unlock during rotation, and causing the backrest member 110 to rotate 180° relative to the second support member 114 before re-triggering the lock mechanism to lock the backrest member 110 with the second support member 114, wherein the first support member 112, the second support member 114 and the base member 116 rotate synchronously, completing the flip of the seat to allow the occupant to sit in the opposite direction. The method 300 may end at 328.

In some examples, the rotation mechanism may be configured on the same side as the output end of the drive mechanism 118. It may include a first four-bar mechanism configured on the first support member 112 and a second four-bar mechanism configured on the second support member 114. Here, a lower end of the first four-bar mechanism is drivably connected to the output end of the drive mechanism 118 to drive the first support member 112 to rotate and the second support member 114 to rotate relative to the first support member 112. Additionally, a lower end of the second four-bar mechanism is drivably connected to an upper end of the first four-bar mechanism to trigger the lock mechanism and drive the backrest member 110 to rotate relative to the second support member 114. Further, an upper end of the second four-bar mechanism is drivably connected to the backrest member 110 to facilitate its rotation relative to the second support member 114.

In some examples, a wheel member 124 having a groove 174 may be configured at the lower end of the second four-bar mechanism, a fixed gear member 120 may be configured at the upper end of the first four-bar mechanism, and a connecting gear member 122 having a pin 172 may be configured between the wheel member 124 and the fixed gear member 120, enabling the fixed gear member 120 to drive the rotation of the connecting gear member 122 and in turn, drive the rotation of the wheel member 124 through the interlocking of the pin 172 and groove 174. In addition, a first gear member 126 may be configured at the upper end of the second four-bar mechanism, and a second gear member 128 may be configured on the backrest member 110, enabling the second four-bar mechanism to drive the rotation of the backrest member 110 relative to the second support member 114.

In some examples, the lock mechanism may include a lock main body member 150 configured on the second support member 114, a matching member 152 at both ends of the backrest member 110 that can engage with the lock main body member 150, and an actuating member 154 fixed relative to the axis of the connecting gear member 122.

In some examples, the drive mechanism may include a motor 210 and a gear set 200 connected to an output end of the motor 210, Here, the gear set may provide a first power output gear 218 for driving the rotation of the first support member 112, and a second power output gear 222 to drive the rotation of the second support member 114 relative to the first support member 112 through the first four-bar mechanism. In some examples, the drive mechanism 118 in may include a housing member 142 (as shown in FIG. 2) with the motor 210 and gear set 200 configured inside it, and the upper surface 140 of the housing member 142 partially overlaps with the lower surface of the base member 116 when the seat is in a stationary state. The housing member 142 can be configured beneath the base member 116 and fixed to the vehicle body, providing support for both the base member 116 and the entire seat. In some examples, the method 300 may include generating the command in response to the individual interacting with a human interface device 38 of the vehicle.

In various examples, although not depicted in the illustrations, the surfaces of the base member 116, the backrest member 110, the first support member 112, and the second support member 114 can be equipped with various cushions to meet the comfort requirements of the occupant. Since the same side of the backrest member 110 always faces the occupant in both the initial and final positions of the seat system 100's flipping, it is only necessary to equip the side facing the occupant with cushions.

The systems and methods disclosed herein provide various benefits over certain existing systems and methods. For example, the systems and methods may offer enhanced comfort for vehicle seats by providing more legroom for the occupant after seat flipping. Additionally, the occupant can simply input a command to automatically flip the seat. Furthermore, as the backrest member rotates 180 degrees relative to the second support member after flipping, always facing the occupant with the same side, it requires cushioning on only one side, leading to cost savings. This enhancement contributes to an elevated user experience and may promote an increase in customer satisfaction.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for flipping a seat in a vehicle, comprising:
   providing a base member for the seat;
   providing a drive mechanism partially used for driving the base member to rotate around a first axis in a horizontal direction left and right relative to a seat occupant, wherein the first axis is centrally located in the base member;
   providing a first support member and a second support member of the seat, wherein a lower end of one side of the first support member is rotatably connected to an output end of the drive mechanism for driven rotation, and a lower end of the second support member is rotatably connected to an upper end of the first support member;
   providing a backrest member, whose left and right sides are located within the second support member and are rotatably connected with the second support member in a horizontal direction along a second axis, wherein the second axis is centrally positioned in the backrest member;
   providing a lock mechanism for locking and unlocking the backrest member with the second support member;
   providing a rotation mechanism;
   receiving, by a control module, a command to flip the seat; and
   activating, with the control module, the drive mechanism to rotate the first support member by a predetermined angle, and to rotate the base member in the same clockwise direction, wherein the rotation mechanism causes the second support member to rotate counterclockwise relative to the first support member, triggering the lock mechanism to unlock during rotation, and causing the backrest member to rotate 180° relative to the second support member before re-triggering the lock mechanism to lock the backrest member with the second support member, wherein the first support member, the second support member and the base member rotate synchronously, completing the flip of the seat to allow the occupant to sit in the opposite direction.

2. The method of claim 1, wherein the rotation mechanism is configured on the same side as the output end of the drive mechanism, comprising a first multi-bar mechanism configured on the first support member and a second multi-bar mechanism configured on the second support member, wherein a lower end of the first multi-bar mechanism is drivably connected to the output end of the drive mechanism to drive the first support member to rotate and the second support member to rotate relative to the first support member, wherein a lower end of the second four-bar multi-bar mechanism is drivably connected to an upper end of the first multi-bar mechanism to trigger the lock mechanism and drive the backrest member to rotate relative to the second support member; and wherein an upper end of the second multi-bar mechanism is drivably connected to the backrest member to facilitate its rotation relative to the second support member.

3. The method of claim 2, wherein a wheel member having a groove is configured at the lower end of the second multi-bar mechanism, a fixed gear member is configured at the upper end of the first multi-bar mechanism, and a connecting gear member having a pin is configured between the wheel member and the fixed gear member, enabling the fixed gear member to drive the rotation of the connecting gear member and in turn, drive the rotation of the wheel member through the interlocking of the pin and groove;

wherein a first gear member is configured at the upper end of the second multi-bar mechanism, and a second gear member is configured on the backrest member, enabling the second multi-bar mechanism to drive the rotation of the backrest member relative to the second support member.

4. The method of claim 3, wherein the lock mechanism includes a lock main body member configured on the second support member, a matching member at both ends of the backrest member that can engage with the lock main body member, and an actuating member fixed relative to the axis of the connecting gear member.

5. The method of claim 2, wherein the drive mechanism comprises a motor and a gear set connected to an output end of the motor;

wherein the gear set provides a first power output gear for driving the rotation of the first support member, and a second power output gear to drive the rotation of the second support member relative to the first support member through the first multi-bar mechanism.

6. The method of claim 5, wherein the drive mechanism further comprises a housing member with the motor and gear set configured inside it, and an upper surface of the housing member partially overlaps with a lower surface of the base member when the seat is in a stationary state.

7. The method of claim 1, further comprising generating the command in response to the individual interacting with a human interface device of the vehicle.

8. A system for flipping a seat in a vehicle, comprising:
a base member for the seat;
a drive mechanism partially used for driving the base member to rotate around a first axis in a horizontal direction left and right relative to a seat occupant, wherein the first axis is centrally located in the base member;
a first support member and a second support member of the seat, wherein a lower end of one side of the first support member is rotatably connected to an output end of the drive mechanism for driven rotation, and a lower end of the second support member is rotatably connected to an upper end of the first support member;
a backrest member, whose left and right sides are located within the second support member and are rotatably connected with the second support member in a horizontal direction along a second axis, wherein the second axis is centrally positioned in the backrest member;
a lock mechanism for locking and unlocking the backrest member with the second support member;
a rotation mechanism; and
a control module for sending a command to flip the seat;
wherein the drive mechanism is activated by the command to rotate the first support member by a predetermined angle, and to rotate the base member in the same clockwise direction, wherein the rotation mechanism causes the second support member to rotate counterclockwise relative to the first support member, triggering the lock mechanism to unlock during rotation, and causing the backrest member to rotate 180° relative to the second support member before re-triggering the lock mechanism to lock the backrest member with the second support member, wherein the first support member, the second support member and the base member rotate synchronously, completing the flip of the seat to allow the occupant to sit in the opposite direction.

9. The system of claim 8, wherein the rotation mechanism is configured on the same side as the output end of the drive mechanism, comprising a first multi-bar mechanism configured on the first support member and a second multi-bar mechanism configured on the second support member, wherein a lower end of the first multi-bar mechanism is drivably connected to the output end of the drive mechanism to drive the first support member to rotate and the second support member to rotate relative to the first support member, wherein a lower end of the second multi-bar mechanism is drivably connected to an upper end of the first multi-bar mechanism to trigger the lock mechanism and drive the backrest member to rotate relative to the second support member; and wherein an upper end of the second multi-bar mechanism is drivably connected to the backrest member to facilitate its rotation relative to the second support member.

10. The system of claim 9, wherein a wheel member having a groove is configured at the lower end of the second multi-bar mechanism, a fixed gear member is configured at the upper end of the first multi-bar mechanism, and a connecting gear member having a pin is configured between the wheel member and the fixed gear member, enabling the fixed gear member to drive the rotation of the connecting gear member and in turn, drive the rotation of the wheel member through the interlocking of the pin and groove;

wherein a first gear member is configured at the upper end of the second multi-bar mechanism, and a second gear member is configured on the backrest member, enabling the second multi-bar mechanism to drive the rotation of the backrest member relative to the second support member.

11. The system of claim 10, wherein the lock mechanism includes a lock main body member configured on the second support member, a matching member at both ends of the backrest member that can engage with the lock main body member, and an actuating member fixed relative to the axis of the connecting gear member.

12. The system of claim 9, wherein the drive mechanism comprises a motor and a gear set connected to an output end of the motor;

wherein the gear set provides a first power output gear for driving the rotation of the first support member, and a second power output gear to drive the rotation of the second support member relative to the first support member through the first multi-bar mechanism.

13. The system of claim 12, wherein the drive mechanism further comprises a housing member with the motor and gear set configured inside it, and an upper surface of the housing member partially overlaps with a lower surface of the base member when the seat is in a stationary state.

14. The system of claim 8, further comprising a human interface device of the vehicle for entering the command.

15. A vehicle, comprising:
a vehicle body; and
a system for flipping a seat in the vehicle, comprising:
  a base member for the seat;
  a drive mechanism partially used for driving the base member to rotate around a first axis in a horizontal direction left and right relative to a seat occupant, wherein the first axis is centrally located in the base member;
  a first support member and a second support member of the seat, wherein a lower end of one side of the first support member is rotatably connected to an output end of the drive mechanism for driven rotation, and a lower end of the second support member is rotatably connected to an upper end of the first support member;
  a backrest member, whose left and right sides are located within the second support member and are rotatably connected with the second support member in a horizontal direction along a second axis, wherein the second axis is centrally positioned in the backrest member;
  a lock mechanism for locking and unlocking the backrest member with the second support member;
  a rotation mechanism;
  a control module for sending a command to flip the seat; and
  a human interface device of the vehicle for entering the command;
  wherein the drive mechanism is activated by the command to rotate the first support member by a predetermined angle, and to rotate the base member in the same clockwise direction, wherein the rotation mechanism causes the second support member to rotate counterclockwise relative to the first support member, triggering the lock mechanism to unlock during rotation, and causing the backrest member to rotate 180° relative to the second support member before re-triggering the lock mechanism to lock the backrest member with the second support member, wherein the first support member, the second support member and the base member rotate synchronously, completing the flip of the seat to allow the occupant to sit in the opposite direction.

16. The vehicle of claim 15, wherein the rotation mechanism is configured on the same side as the output end of the drive mechanism, comprising a first multi-bar mechanism configured on the first support member and a second multi-bar mechanism configured on the second support member,
  wherein a lower end of the first multi-bar mechanism is drivably connected to the output end of the drive mechanism to drive the first support member to rotate and the second support member to rotate relative to the first support member,
  wherein a lower end of the second multi-bar mechanism is drivably connected to an upper end of the first multi-bar mechanism to trigger the lock mechanism and drive the backrest member to rotate relative to the second support member; and
  wherein an upper end of the second multi-bar mechanism is drivably connected to the backrest member to facilitate its rotation relative to the second support member.

17. The vehicle of claim 16, wherein a wheel member having a groove is configured at the lower end of the second multi-bar mechanism, a fixed gear member is configured at the upper end of the first multi-bar mechanism, and a connecting gear member having a pin is configured between the wheel member and the fixed gear member, enabling the fixed gear member to drive the rotation of the connecting gear member and in turn, drive the rotation of the wheel member through the interlocking of the pin and groove;
  wherein a first gear member is configured at the upper end of the second multi-bar mechanism, and a second gear member is configured on the backrest member, enabling the second multi-bar mechanism to drive the rotation of the backrest member relative to the second support member.

18. The vehicle of claim 17, wherein the lock mechanism includes a lock main body member configured on the second support member, a matching member at both ends of the backrest member that can engage with the lock main body member, and an actuating member fixed relative to the axis of the connecting gear member.

19. The vehicle of claim 16, wherein the drive mechanism comprises a motor and a gear set connected to an output end of the motor;
  wherein the gear set provides a first power output gear for driving the rotation of the first support member, and a second power output gear to drive the rotation of the second support member relative to the first support member through the first multi-bar mechanism.

20. The vehicle of claim 19, wherein the drive mechanism further comprises a housing member with the motor and gear set configured inside it, and an upper surface of the housing member partially overlaps with a lower surface of the base member when the seat is in a stationary state.

* * * * *